(12) United States Patent
Chavez et al.

(10) Patent No.: US 7,412,044 B2
(45) Date of Patent: Aug. 12, 2008

(54) INSTANT MESSAGING TO AND FROM PBX STATIONS

(75) Inventors: David L. Chavez, Thornton, CO (US);
Kevin S. Cripps, Westminster, CO (US);
Kurt H. Haserodt, Westminster, CO (US)

(73) Assignee: Avaya Technology Corp., Basking Ridge, NJ (US)

( * ) Notice: Subject to any disclaimer, the term of this patent is extended or adjusted under 35 U.S.C. 154(b) by 1022 days.

(21) Appl. No.: 10/619,636

(22) Filed: Jul. 14, 2003

(65) Prior Publication Data
US 2005/0013421 A1 Jan. 20, 2005

(51) Int. Cl.
*H04M 3/42* (2006.01)

(52) U.S. Cl. ............... 379/201.01; 379/387.01; 455/415; 455/417; 709/200; 709/206; 709/238

(58) Field of Classification Search ............ 379/201.01, 379/387.01; 455/415, 417; 709/200, 206, 709/238
See application file for complete search history.

(56) References Cited

U.S. PATENT DOCUMENTS

| | | | |
|---|---|---|---|
| 4,086,438 A * | 4/1978 | Kahn et al. ............ | 379/158 |
| 4,277,649 A | 7/1981 | Sheinbein | |
| 4,918,721 A | 4/1990 | Hashimoto | |
| 5,206,903 A | 4/1993 | Kohler et al. | |
| 5,247,571 A | 9/1993 | Kay et al. | |
| 5,339,356 A | 8/1994 | Ishii | |
| 5,386,459 A | 1/1995 | Veeneman et al. | |
| 5,404,395 A | 4/1995 | Bogart et al. ............ | 379/201 |
| 5,425,077 A | 6/1995 | Tsoi | |
| 5,452,347 A | 9/1995 | Iglehart et al. | |
| 5,572,572 A | 11/1996 | Kawan et al. | |
| 5,577,110 A | 11/1996 | Aquino | |
| 5,615,257 A | 3/1997 | Pezzullo et al. | |
| 5,659,603 A | 8/1997 | Orlofsky | |
| 5,790,646 A | 8/1998 | Moon | |
| 5,794,156 A | 8/1998 | Alanara | |
| 5,828,747 A | 10/1998 | Fisher et al. | |
| 5,905,793 A | 5/1999 | Flockhart et al. | |
| 5,956,655 A | 9/1999 | Suzuki et al. | |
| 5,982,873 A | 11/1999 | Flockhart et al. | |
| 5,999,827 A | 12/1999 | Sudo et al. | |
| 6,038,302 A | 3/2000 | Burok et al. | |
| 6,044,403 A | 3/2000 | Gerszberg et al. | |

(Continued)

FOREIGN PATENT DOCUMENTS

EP 0 980 176 2/2000

(Continued)

OTHER PUBLICATIONS

U.S. Appl. No. 10/370,845, filed Feb. 21, 2003, Boyle et al.

(Continued)

*Primary Examiner*—Quynh H Nguyen
(74) *Attorney, Agent, or Firm*—Sheridan Ross P.C.

(57) ABSTRACT

The present invention is directed to a message interfacing agent 224 enables a circuit-switched communication device 106, such as a telephone, to receive and respond to electronic messages and the feature server 228 enables external endpoints to access switch/server functionality using packet-switched communications.

45 Claims, 8 Drawing Sheets

U.S. PATENT DOCUMENTS

| | | | |
|---|---|---|---|
| 6,163,607 | A | 12/2000 | Bogart et al. |
| 6,169,797 | B1 | 1/2001 | Wildgrube et al. |
| 6,173,053 | B1 | 1/2001 | Bogart et al. |
| 6,192,122 | B1 | 2/2001 | Flockhart et al. |
| 6,203,192 | B1 | 3/2001 | Fortman |
| 6,204,848 | B1 | 3/2001 | Nowlan et al. |
| 6,215,474 | B1 | 4/2001 | Shah |
| 6,246,983 | B1 | 6/2001 | Zou et al. |
| 6,434,226 | B1 | 8/2002 | Takahashi |
| 6,434,266 | B1 | 8/2002 | Kanno et al. |
| 6,463,304 | B2 | 10/2002 | Smethers |
| 6,516,061 | B2 | 2/2003 | Horowitz et al. |
| 6,546,004 | B2 | 4/2003 | Gullicksen |
| 6,546,239 | B1 | 4/2003 | Pazdersky et al. |
| 6,554,707 | B1 | 4/2003 | Sinclair et al. |
| 6,567,075 | B1 | 5/2003 | Baker et al. |
| 6,625,141 | B1 | 9/2003 | Glitho et al. |
| 6,665,723 | B2 | 12/2003 | Trossen |
| 6,754,314 | B2 | 6/2004 | Wengrovitz et al. |
| 6,788,676 | B2 | 9/2004 | Partanen et al. |
| 6,798,767 | B1 | 9/2004 | Alexander et al. |
| 6,823,197 | B1 | 11/2004 | Chen et al. |
| 6,920,339 | B1 | 7/2005 | Choy et al. |
| 6,937,597 | B1 | 8/2005 | Rosenberg et al. |
| 6,944,150 | B1 | 9/2005 | McConnell et al. |
| 6,950,441 | B1 | 9/2005 | Kaczmarczyk et al. |
| 6,990,353 | B2 * | 1/2006 | Florkey et al. ............... 455/519 |
| 6,996,076 | B1 | 2/2006 | Forbes et al. |
| 7,031,443 | B2 | 4/2006 | St-Onge et al. |
| 7,149,506 | B2 | 12/2006 | Osterhout et al. |
| 7,197,124 | B2 * | 3/2007 | Hutchinson, IV ...... 379/201.01 |
| 7,218,722 | B1 | 5/2007 | Turner et al. |
| 7,242,680 | B2 | 7/2007 | Gallant |
| 7,257,201 | B2 | 8/2007 | Singh et al. |
| 2002/0077080 | A1 * | 6/2002 | Greene ....................... 455/412 |
| 2002/0122547 | A1 | 9/2002 | Hinchey et al. |
| 2002/0137490 | A1 | 9/2002 | Gallant |
| 2003/0016810 | A1 | 1/2003 | Milton ....................... 379/242 |
| 2003/0016811 | A1 | 1/2003 | Milton ....................... 379/245 |
| 2003/0072422 | A1 | 4/2003 | Wengrovitz et al. |
| 2003/0231748 | A1 | 12/2003 | Novelline |
| 2005/0027867 | A1 | 2/2005 | Mueller et al. |
| 2005/0144008 | A1 | 6/2005 | Groves et al. |

FOREIGN PATENT DOCUMENTS

| | | |
|---|---|---|
| EP | 1037451 A | 9/2000 |
| JP | 05-260176 | 10/1993 |
| JP | 09-135320 | 5/1997 |
| JP | 2002-084370 | 3/2002 |
| JP | 2002-259300 | 9/2002 |
| WO | WO 01/35615 | 5/2001 |

OTHER PUBLICATIONS

U.S. Appl. No. 10/387,112, filed Mar. 11, 2003, Milton.

Avaya Inc.'s "Multivantage™ Software: Product Summary" at http://www.avaya.com/ac/common/index.jhtml?location=M1H1005G1002F2013P3042N4292 (printed Nov. 20, 2002).

Avaya Inc.'s "EC500 Key Features" at http://www.avaya.com/ac/common/index.jhtml?location=M1H1005G1015F2062P3142N4988 (printed Nov. 20, 2002).

Avaya Inc.'s "EC500: Product Summary" http://www.avaya.com/ac/common/index.jhtml?location=M1H1005G1015F2062P3142N4986 (printed Nov. 20, 2002).

"IP LAN Telephony: the Technology Migration Imperative" Avaya Executive Briefing Paper (Feb. 2002), pp. 1-21.

"Avaya Announces New Enterprise Class IP Solutions (ECLIPS)" *Communication without Boundaries* (2002).

David Chavez et al., "Avaya MultiVantage™ Software: Adapting Proven Call Processing for the Transition to Converged IP Networks," *Communication without Boundaries* (Aug. 2002).

"SIP (Session Initiation Protocol) in Enterprise-Class IP Telephony Networks," *Communication without Boundaries* (2002).

Avaya Communications, "EC500 Extension to Cellular, Release 2, User's Guide," Issue 1 (Jul. 2001).

Avaya, "EC500 Extension to Cellular, Release 3, User's Guide," Issue 2 (Jan. 2002).

Avaya, "EC500 Extension to Cellular, Release 3 and Release 4, User's Guide," Issue 3 (Aug. 2002).

Avaya, "EC500 Extension to Cellular, Release 4, User's Guide," Issue 4 (Aug. 2002).

Lucent Technologies, "6408+, 6408D+, 6416+M, 6424+, and 6424+M Telephones User's Guide," Issue 3, Apr. 1999, pp. 1-28.

Aim Wireless, "Learn How to Type Using Your Phone," Mar. 13, 2003, available at http://www.aim.com/wireless/typing_messages.htm, 3 pages.

European Search Report for European Patent Application No. 04252350 dated Oct. 15, 2004, which is the European counterpart for the above-referenced patent application.

Communication transmitting European Search Report for European Patent Application No. 04252350.6 dated Feb. 3, 2005.

Definity. RTM., Enterprise Communicatins Server, Release 6, Administration and Feature Description, "Terminal Translation Initialization," pp. 4-562 to 4-569, Aug. 19907. cited by other.

Definity.RTM., Enterprise Communications Server, Release 6, Administration and Feature Description, "Bridged Call Appearance," pp. 4-109 to 4-124, Aug. 1997. cited by other.

Product Brochure, "Avaya Converged Communications Server," (2004), 6 pages.

Greenfield, David, "Avaya's SIP-Standarized IP Telephony" Network Magazine (Mar. 15, 2004), available at http://www.networkmagazine/shared/article/showArticle.jhtml?articleId=18200469, 2 pages.

3GPP Specifications: Plenary Meeting Details (printed Mar. 30, 2004) available at http://www.3gpp.org/ftp/Specs/html-info/PlenaryMeetings.htm, 44 pages.

Kiss, Krisztian, "Signalling flows for the IP multimedia call control based on Session Initiation Protocol (SIP) and Session Description Protocol (SDP); Stage 3" 3GPP TS Specification: 24.228 (printed Mar. 30, 2004) available at http://www.3gpp.org/ftp/Specs/html-info/24228.htm, 2 pages.

Drage, Keith, "Internet Protocol (IP) multimedia call control protocol based on Session Initiation Protocol (SIP) and Session Description Protocol (SDP); Stage 3" 3GPP TS Specification: 24.229 (printed Mar. 30, 2004) available at http://www.3gpp.org/ftp/Specs/html-info/24229.htm, 2 pages.

Segev, Uri, "AD405 SIP—What Can you Do With It?" IMB The Workplace for Innovation, Lotus Software, (undated) 49 pages.

Lektenius, Johan, "ISN Major Project," University of Technology, Sydney, Faculty of Engineering (2002), 30 pages.

Examiner's Report for Canadian Patent Application No. 2462316, mailed Aug. 2, 2006.

Examiner's Report for Canadian Patent Application No. 2462316, mailed Jul. 27, 2007.

Examination Report for European Patent Application No. 04252350.6, dated Jul. 6, 2007.

First Office Action (including translation) for Japanese Patent Application No. 2004-206645, mailed Aug. 29, 2007.

\* cited by examiner

| Keypad two-key to character mapping ||||||||||||
| 2nd<br>1st | 1 | 2 | 3 | 4 | 5 | 6 | 7 | 8 | 9 | 0 | * |
| 1 | <bs> | <Sp> | : | @ | | | | | | 1 | |
| 2 | a | b | c | | | | | | | 2 | |
| 3 | d | e | f | | | | | | | 3 | |
| 4 | g | h | i | | | | | | | 4 | |
| 5 | j | k | l | | | | | | | 5 | |
| 6 | m | n | o | | | | | | | 6 | |
| 7 | p | q | r | s | | | | | | 7 | |
| 8 | t | u | v | | | | | | | 8 | |
| 9 | w | x | y | z | | | | | | 9 | |
| 0 | | | | | | | | | | 0 | |
| *̶ | | | ~~delete~~ | | | | ~~prev~~ | | ~~next~~ | | |
| * | <more> | | delete | | | | prev | | next | | |
| # | Send Message ///////////// ||||||||||||

*Fig. 8*

INSTANT MESSAGING TO AND FROM PBX STATIONS

CROSS REFERENCE TO RELATED APPLICATIONS

The present application contains subject matter related to U.S. patent application Ser. No. 10/370,845, filed Feb. 21, 2003, entitled "Subscriber Mobility in Telephony Systems" to Boyle et al.; Ser. No. 10/387,112 filed Mar. 11, 2003, entitled "Switch Buttons Activated from an External Network" to Milton; Ser. No. 09/908,155, filed Jul. 18, 2001, entitled "Method and Apparatus for Treating Externally-Originated Calls as Coming from Internal Switch Extensions" to Milton; and Ser. No. 09/908,156, filed Jul. 18, 2001, entitled "Method and Apparatus for Extending Calls to Internal Switch Extensions Out to External Network Endpoints" to Milton, each of which is incorporated herein by reference.

FIELD OF THE INVENTION

The present invention relates generally to electronic message processing in communication systems and particularly to electronic message processing in telephony systems.

BACKGROUND OF THE INVENTION

Electronic messaging is gaining in popularity in both business and private applications. One type of electronic messaging is referred to as e-mail. E-mail is widely available not only within local area networks but also in wide area networks such as the Internet. Email is typically archived for long periods pending review by the recipient or as instructed by the recipient. Another type of electronic messaging is referred to as Instant Messaging. In Instant Messaging, the electronic mail is coupled with an awareness of presence of each participant (as enabled by protocols such as the Session Initiation Protocol or SIP) to provide a near realtime electronic conversation back and forth between the participants. Typically, instant messages pop up on the display of the recipient and, when responded to, are deleted automatically. Instant messaging has proven to be quite popular in the Internet Service Provider or ISP/portal space.

Service providers (both Internet Service Providers (ISP) and cell phone service providers) offering instant messaging/presence services today include Yahoo™, AOL™, AT&T™, Microsoft™, to name but a few. Most service providers require a PC platform, though some have built cell phone interfaces for instant messaging, such as the MLIFE™ offer of AT&T™. Service providers have yet to provide instant messaging capabilities to any non-SIP endpoint or software enabled phone. Businesses and private parties are desirous of obtaining such service on a wider variety of communication devices, including Digital Control Protocol or DCP and H.323 enabled telephones.

SUMMARY OF THE INVENTION

These and other needs are addressed by the various embodiments and configurations of the present invention. The present invention is directed to configuring a variety of types of communication devices to send and receive electronic messages and to remotely activate telephony functions/features of a communication device in an enterprise network.

In one embodiment of the present invention, a method for enabling a telephone to send and receive electronic messages is provided. The method includes the steps of:

(a) providing a switch/server that is in communication with an internal telephone; and (b) performing, at the switch/server, one or more of a first, second, and third set of operations. As used herein, "electronic message" is intended to include not only e-mail and instant messages but also other type of electronic messages, such as packetized voice streams (e.g., voice-over-IP), facsimile, etc., and a "telephone" refers to an analog or digital circuit-switched communication device configured for live (real time) voice communications. As will be appreciated, the telephone generally includes a display, a keypad, and a handset including a microphone and a speaker.

The first set of operations is related to delivery of an electronic message to the telephone and includes the steps of:

(i) receiving an electronic text message intended for a user associated with the internal telephone;

(ii) determining that the electronic message is to be directed to the internal telephone; and (iii) causing the text of the electronic message to be displayed on a display of the internal telephone.

The second set of operations is directed to sending an electronic message to an endpoint on behalf of the telephone and includes the steps of:

(i) receiving, from the internal telephone, a number of signals associated with activation of feature activators;

(ii) associating the signals with one or more corresponding letters and/or numbers to provide text for a message;

(iii) forming the text into an electronic message including a source address, a destination address, and the text; and (iv) forwarding the electronic message to the destination address.

The third set of operations is directed to reviewing from the telephone a cached, buffered, or otherwise stored electronic message and includes the steps of:

(i) receiving, from the internal telephone, a request to view the text of a selected electronic message; and (ii) causing the text of the electronic message to be displayed on the display of the internal telephone.

The first set of operations can be implemented in a number of ways. For example, the sender of an electronic message can redefine, in a manner set forth in the electronic text message, the symbols and/or functions associated with feature activators (e.g., keys) on the internal telephone. Activation of a redefined feature activator causes the switch/server to associate a redefined, corresponding symbol and/or function with the activated feature activator. The redefined, corresponding symbol and/or function is different from the default symbol and/or function assigned to the feature activator in the normal call mode. In another example, the text of the electronic message is displayed at least substantially simultaneously on the displays of a number of internal telephones. This functionality replicates the paging capabilities in standard voice telephony.

The second set of operations can also be performed in a variety of ways. By way of illustration, the second set of operations can be associated with responding to a received electronic message or originating an electronic message. The association of the signals with symbols/functions can be effected by mapping the received signals (from activation of feature activation) against a stored list or table to identify the corresponding letters and/or numbers. As used herein, "mapping" refers broadly to include any technique for determining if a given identifier has a corresponding entry on a stored list. A predetermined text message can be associated with one or more of the signals to provide increased user convenience. The destination address can be inputted by the user, derived from the source address of a received electronic text message to which the formed electronic message is responsive, and/or selected from the user among a predetermined set of destination addresses. To facilitate user generation of electronic messages the operational mode of the internal telephone can be changed from a call mode to a message mode in which letters can be readily inputted by the user.

In yet another embodiment, a method for accessing switch functionality from an external endpoint is provided that includes the steps of:

(a) providing a switch/server, an internal endpoint, and an external endpoint, each of the internal and external endpoints being in communication with the switch/server and associated with a common user and the internal endpoint including a plurality of feature activators for activating a plurality of features;

(b) receiving from the external endpoint an incoming contact including a packet-switched communication including an identity of a feature activator and/or a feature;

(c) determining if the identified feature activator and/or feature has a corresponding entry in a stored list or table of identifiers, the entry being associated with a feature activator identifier associated with one or more feature activators and/or a feature identifier associated with one or more features; and (d) when the identified feature activator and/or feature has a corresponding entry in the stored list, activating the associated feature activator and/or feature.

The endpoints are preferably communication devices. The word "communication device" as used herein should therefore be understood to include not only wired or wireless desktop telephone communication devices but also other types of processor-based communication devices, including without limitation mobile telephones, personal computers, IP hardphones, IP softphones, personal digital assistants (PDAs), etc.

The determining step can be performed by mapping the identified feature activator and/or feature associated with the incoming contact to the corresponding entry in the stored list. The feature activator and feature identifiers can be defined by a numeric, alphabetical, or alphanumeric code or scheme.

The stored list or table can be implemented in a number of ways. The feature activator identifiers can be based upon activator position on the internal endpoint (e.g., key position in the keypad) and/or by the identity of the feature corresponding to the feature activator.

In the activating step the switch/server processes the associated feature activator identifier and/or feature identifier as if the user had pressed the associated feature activator in the internal endpoint while the internal endpoint was in service and off hook.

There is a broad variety of features that can be activated by this approach. Examples include: (a) features that are invoked prior to placing a contact, (b) features that are invoked during a contact, (c) features that are non-contact associated that do not require display interactions, (d) features that are non-contact associated that require display interactions, (e) features that are operated against contacts not associated with the activating station, and (f) features that are operated against an alerting contact.

Differing endpoints can have differing associations between feature activators and features. For example, a common identified feature activator and/or feature can define a first feature for a first internal endpoint and a second feature for a second internal endpoint, with the first and second features being different.

To provide the person seeking to activate, deactivate, or modify a feature with confirmation of success, an electronic message can be sent to the user indicating the success or failure of feature activation, deactivation, or modification.

The various embodiments of the invention can have numerous advantages. For example, the present invention can permit a telephone, particularly a digital telephone, to be used not only for real time live voice communications but also for text messaging. This is possible even when the telephone does not have a resident or collocated computer. During a telephone conversation a participant can now communicate privately with other participants on the call or with third parties. Service providers can thus now provide instant messaging capabilities to any non-SIP endpoint or software enabled phone. Advantageously, businesses and private parties will now be able to obtain instant messaging service on a wider variety of communication devices, including Digital Control Protocol or DCP and H.323 enabled telephones. The present invention can permit a sender to redefine the function/symbolic associations of the keys on the recipients keypad. In this manner, a sender, who may be using a more capable messaging device such as a PC, can provide a convenient methodology for the user to respond to the message. The present invention can provide access to switch feature functionality through packet-switched communication devices. A user's ability to remotely access switch-based features can lead not only to increased user convenience but also to increased user efficiency. End users, for example, can provide an executive/secretary feature operation without requiring the secretary to perform any tasks. The ability to have different features of different endpoints associated with a common feature identifier provides a high degree of flexibility. This is highly advantageous for not only the different types but also the different models of communication devices prevalent in many offices today. This is possible because, from a call-processing point of view, the different users simply "pushed" a button where the same button location on their respective endpoints invokes different features. It is difficult, for example, for users to compare their speed dial entries because each user can be using the same DID speed dial to invoke a different feature.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 8 depicts an exemplary mapping table used by the electronic message interfacing agent.

DETAILED DESCRIPTION

The Communication System

The invention will be illustrated below in conjunction with an exemplary communication system. Although well suited for use with, e.g., a system having a private branch exchange (PBX) or other similar contact processing switch, the invention is not limited to use with any particular type of communication system switch or configuration of system elements. Those skilled in the art will recognize that the disclosed techniques may be used in any communication application in which it is desirable to provide improved contact processing directed from an external network into a PBX or other communication system switch.

Figure 1:
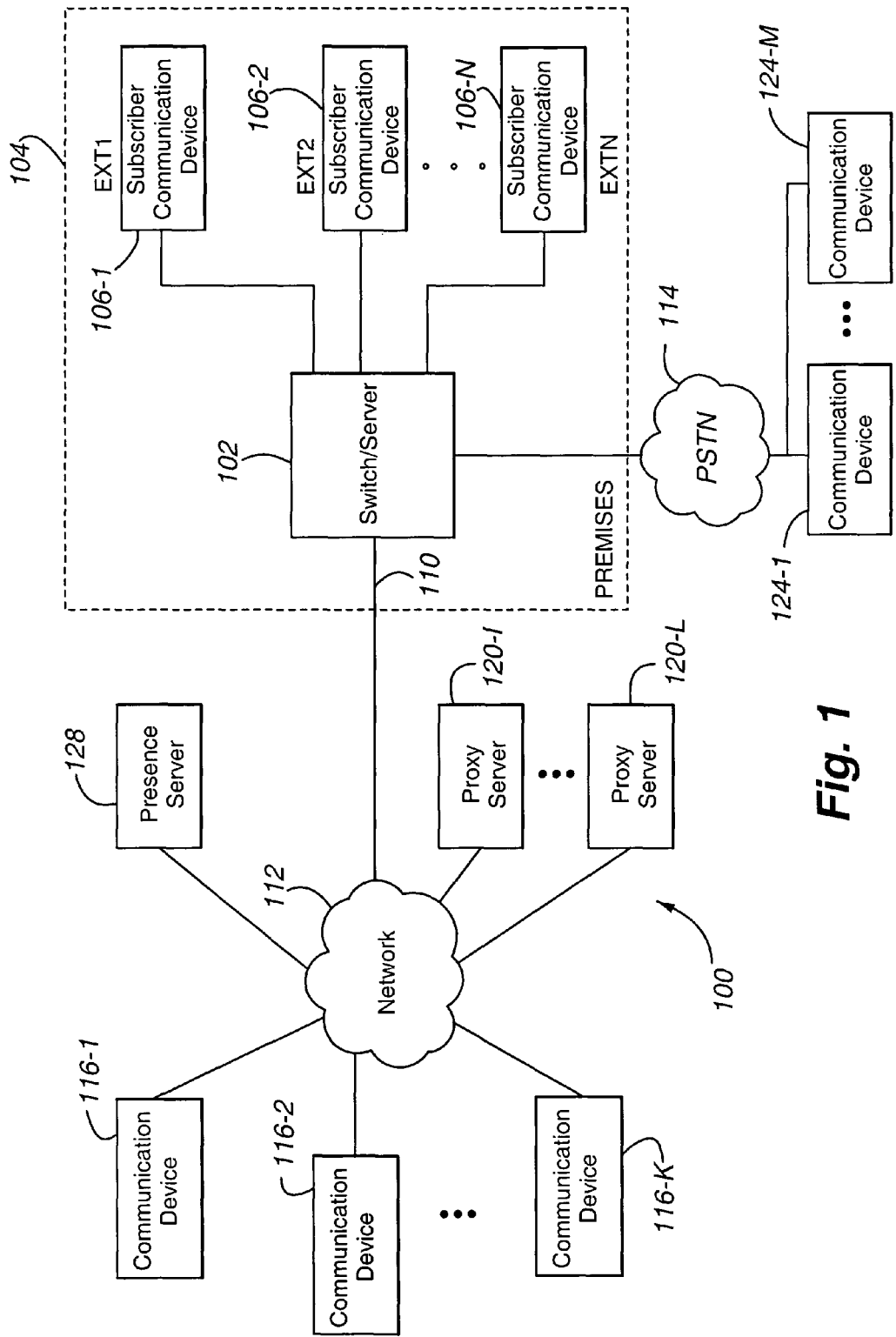
FIG. 1 shows an exemplary communication system according to an embodiment of the present invention.

FIG. 1 shows an exemplary communication system 100 in which the invention is implemented. The system 100 includes a switch/server 102 which serves a premises 104 having a first plurality of communication devices 106-1, 106-2, ... 106-N that are subscribers to the switch 102. Each of the communication devices 106-1, 106-2, ... 106N corresponds to one of a set of internal extensions Ext1, Ext2, ... ExtN, respectively as shown. These extensions are referred to herein as "internal" in that they are extensions within the premises 104 that are directly serviced by the switch. More particularly, these extensions correspond to conventional communication device endpoints serviced by the switch/server, and the switch/server can direct incoming calls to and receive outgoing calls from these extensions in a conventional manner.

The term "switch/server" as used herein should be understood to include a PBX, an enterprise switch, or other type of telecommunications system switch or server, as well as other types of processor-based communication control devices such as media servers, computers, adjuncts, etc.

The switch/server 102 is also coupled via one or more communication lines 110 to a packet-switched network 112. In one configuration, the network is a distributed processing network, such as the Internet. The lines 110 carry incoming contacts from the network 112 to the switch/server 102 for processing and carry outgoing contacts from the switch/server 102 to the network 112. The network 112 is coupled to a second plurality of communication devices 116-1, 116-2, ... 116-K. Preferably to permit effective mapping by the switch, the networks or other transit networks between the user's external communication device and corresponding internal communication device are configured such that the switch/server receives not only the intended destination address but also the source address or identity of the external device initiating the contact.

It should be noted that the invention does not require any particular type of information transport medium between switch/server 102 and communication devices 116, i.e., the invention may be implemented with any desired type of transport medium as well as combinations of different types of transport media.

The packet-switched network 112 can be any data and/or distributed processing network, such as the Internet. The network 219 tropically includes proxies 120-1 to L, registrars (not shown), and routers (not shown) for manacling packet flows.

The enterprise network 104 is also in communication circuit-switched networks 114, such as the Public Switched telephone Network or PSTN. This network is in turn in communication with a third plurality of communication devices 124-1 to M.

The first and third plurality of communication devices 106-1 to N, and 124-1 to M can be any communication device suitable for the network to which they are connected. The first and third plurality of communication devices are connected to a circuit-switched network and can include, for example, wired and wireless telephones, PDAs, pagers, facsimile machines, modems, H.320 video phones and conferencing units, voice messaging and response units, traditional computer telephony adjuncts, and loudspeaker paging and announcement units. The second plurality of communication devices 116-1 to K are connected to the packet-switched network 112 and can include, for example, IP hardphones such as the Avaya, Inc.'s, 4600 Series IP Phones™, IP softphones such as Avaya, Inc.'s, IP Softphone™, Personal Digital Assistants or PDAs, Personal Computers or PCs, laptops, packet-based H.320 video phones and conferencing, units, packet-based voice messaging and response units, packet-based traditional computer telephony adjuncts, and packet-based loudspeaker paging and announcement Units.

Each of the communication devices 116-1, 116-2, ... 116-K and 124-1, ... 124-M represents an external communication device not corresponding to any internal extension of the switch/server 102. These communication devices are referred to as "external" in that they are not directly supported as communication device endpoints by the switch/server 102. The communication devices 116 and 124 are an example of devices more generally referred to herein as "external endpoints."

The presence server 128 collects presence information about a communication device and/or user thereof and stores the collected information in a presence information database. The presence server 128 provides the collected information to other network entities in response to queries. The presence server 128 can collect information respecting the user's interaction with the various entities of FIG. 1 and/or other information provided directly or indirectly by the user. For example, the presence server 128 can interact with a presence service (not shown) that continually collects and redistributes availability data from publishing sources authorized by the user.

The proxy servers 120-1 to 120-L are responsible for contact routing and session management. It can also perform redirect functions, routing to media gateways, and user authentication. Before routing a session to its addressee, the proxy server queries one or more of a domain name server, the presence scraper, or other location server. A "proxy server" refers to a computer that stores information acquired from other computational components on a network and makes it available to other computers in a defined area. The proxy server has packet-switched capabilities and can include predefined rules regarding contact routing and session management, redirect functions, routing to media gateways, and user authentication. Before routing a session to its addressee, the proxy server typically queries either a domain name server or a presence server.

As will be described in greater detail below, the present invention in accordance with an embodiment of the present invention configures the switch/server 102 such that one or more of the external communication devices 116 and 124 arc treated substantially as internal switch extensions. Advantageously, this allows a given external communication device to access at least a subset of the desirable contact processing features provided by the switch/server 102.

It should be emphasized that the configuration of the switch, user communication devices, and other elements as shown in FIG. 1 is for purposes of illustration only and should not be construed as limiting the invention to any particular arrangement of elements.

In a preferred configuration, the telephony switch/media server 102, network 112, second plurality of communication devices 116, presence server 128, and proxy servers 120 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, a nd analog fine or trunk.

Figure 2:
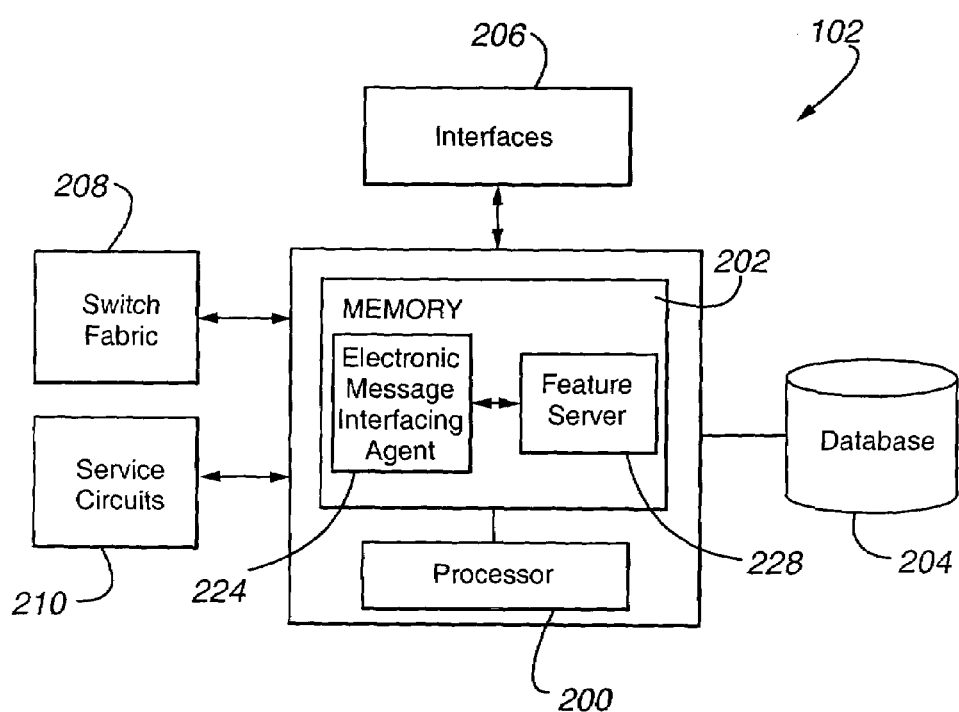
FIG. 2 is a block diagram showing a switch/server configuration according to an embodiment of the present invention.

FIG. 2 shows a more detailed view of one possible implementation of the switch/server 102 in the system of FIG. 1. The switch/server 102 in this implementation includes a processor 200, a memory 202, a database 204, one or more interfaces 206, a switch fabric 208, and a set of service circuits 210. The processor 200 may be implemented as a central processing unit (CPU), microprocessor, application-specific integrated circuit (ASIC) or other type of digital data processor as well as a various portions or combinations of such elements. The memory may be a random access memory (RAM), a read-only memory (ROM), or combinations of these and other types of electronic memory devices.

The telephony switch/media server 102 can be any architecture for directing contacts to one or more communication devices. Illustratively, the switch/server 102 of FIG. 2 can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ private-branch exchange (PBX)-based ACD system; Avaya Inc.'s MultiVantage™ PBX, or Avaya, Inc.'s, S8300™ media server. Other types of known switches and servers are well known in the art and therefore not described in detail herein. The switch or media server 102 typically is a stored-program-controlled system. The switch/server 102 comprises a network interface card (not shown) to provide services to the second plurality of communication devices 106. Included in the memory 202 is a contact controller (not shown) to handling incoming and outgoing contacts, and a media gateway for signal conversion from packet-switched to circuit-switched and vice versa, an electronic message interfacing agent 224 and a feature server 228, which are discussed in detail below. Exemplary media gateways include Avaya Inc.'s, G700 Media Gateway™ and may be implemented as hardware such as via an adjunct processor or chip in the switch/server.

The electronic message interfacing agent 224 enables the communication devices 106 to receive and respond to electronic messages. The agent 224 receives packet-switched electronic messages from communication devices 116, checks the integrity of the message, performs any necessary authentication, determines the communication device(s) 106 the message is destined for and updates the display of the communication device(s) to show the message. The agent 224 receives either original or responsive messages from a communication device 106 in a form defined by the protocol governing communications between the internal communication device and the switch/server, such as the Digital Control Protocol, or H.323, determines the identities of the feature activators pushed and the text of the consequential electronic message, places the message in a suitable form for transmission to another subscriber communication device or over the network 112 to an external communication device (the form being defined by the protocol(s) in use by the network, such as SIP), and effectuates transmission of the message. As used herein, a "feature activator" refers to the user interface controls on a communication device that permits the user to activate features from the communication device. Although the interface controls typically are implemented as a plurality of buttons, they may be implemented in many other forms, such as a touch screen, toggles, a pointer device such as a mouse, and combinations thereof.

Figure 7:
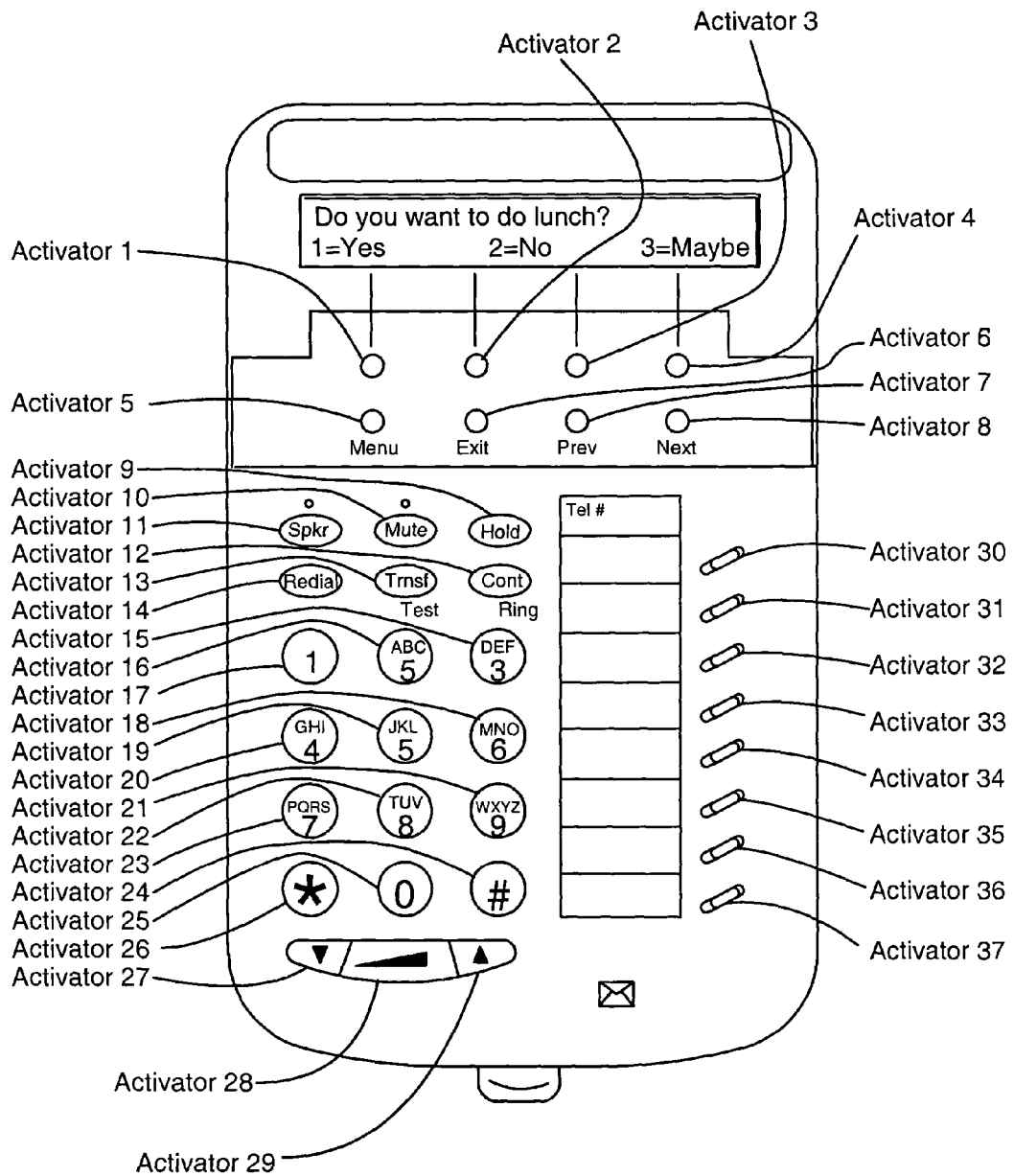
FIG. 7 depicts a typical communication device having feature activators.

The reply to an electronic message or an originated message can be input or generated by a number of differing techniques. For example, to reply to an incoming message the message itself can associate the feature activators of the receiving communication device 106 with selected responses. An example is shown in FIG. 7. FIG. 7 depicts a telephone (with the cradle and handset omitted for simplicity) including a plurality of feature activators, namely activators 1-37. As shown by the display, which displays the text of an incoming electronic message, the "1" key (activator 17) is associated with a "yes" response, the "2" key (activator 16) with a "no" response, and the "3" key (activator 15) with a "maybe" response. Pressing one of these keys will automatically send an electronic message back to the sender with the text corresponding to the text after the equals sign (such as "yes" for activator 17). The activators used to generate text are normally the main buttons associated with the device. In the example of FIG. 7, these activators arc activators 15-26. The normal functions of these activators are overridden while the device is in message mode. In another technique, a canned response/message can be selected from among a group of (user-defined or administered) canned responses/messages. For example, the user or administrator can define activator 17 to be a "yes", activator 16 to be a "no", activator 15 to be a "maybe", and activator 20 to be a "no response". Full text messages, such as "Do you want to do lunch?", "Can we have a meeting today?", "Are you currently available?", and the like can be associated with selected activators or combinations of activators to permit users conveniently and quickly to originate and send electronic messages from their communication device. Finally, the reply or originated message text can be composed with the activators, typically the numeric keypad (activators 15-26). Each character normally requires two activators to be pressed (e.g., two keystrokes) according to a predefined lap. An example of a map is the table shown in FIG. 8. Relative to the activator definitions in the call mode, the map has, in the message mode, redefined the normal functions/symbols associated with at least most the activators. The vertical row 800 of activators refers to the first activator pressed and the horizontal row 804 of activators to the second key. The letter or number generated by the activator press sequence is provided in the corresponding, table entry. Thus, pressing activator 17 (the "1" key) followed by activator 16 (the "29" key) provides a space. When the text is completed, the message maybe sent by pressing a suitable activator, such as activator 24 (the "#" key). In another example, the user, when a specific letter is desired, can press the associated number activator (e.g., for the letter "a", "b", or "c" the key for the number "2"), and the user can scroll through the three possible letter choices. When the desired letter is highlighted or otherwise indicated, the user can press another activator to make the selection. In yet another example, voice recognition may be used by the user to convert a spoken message into an electronic text message. As will be appreciated, the response/message can be generated using a combination of the above techniques. In an exemplary configuration, a number of predefined messages and predetermined responses to those messages are provided. A message could be "Call me hen thou are done" and the predetermined responses to that message could be "Yes", "No", or "I'll try".

The term "stored list" or "table" should be understood to include any ordered set of information or data stored in memory or other storage device accessible to the switch/server. The invention does not require that the information be stored in any particular length or format, e.g., a tabular format, a closed- or open-set, and numerous suitable storage formats will be readily apparent to those skilled in the art.

The destination address can be provided in a number of ways. When an incoming message is being responded to, the destination address of the response is typically the source address of the message which is maintained in a cache at the switch/server. When an original message is being generated and transmitted by the communication device, the destination can be indicated by inputting the associated extension (or external digit string), such as the sign-in name handle portion of the address, or by selecting the destination from a predetermined or preselected list of addresses (such as a contact list). In one configuration, some of the keys of the keypad are redefined so that each key corresponds to a specific destination address. The domain name portion (@servername) can be specified or, in the absence of such specification, the address of the switch/service with which the communication device is registered will be assumed to be the correct address. When the message is to an external communication device, the destination can be selected from among a set of preselected destinations administered by the switch/server.

Although any message format may be used, the preferred format is the URI of the destination, followed by the message text. For example, the preferred format is "sip: KurtHaserodt@pcl How about lunch?". When no URI is specified, the message is sent back to the sender of the message that is currently being viewed. A defined activator can provide access to other functions by pressing more activators.

When an internal communication device receives all electronic message, a ring tone is played (unless the communication device is already on a voice communication or call) and the device automatically enters a message mode from the normal call mode (in which telephone calls are made from or received by the communication device).

A set of messages is maintained for the display of each internal communication device. When there are multiple electronic messages or the electronic message is too large to fit in the display, an activator, such as the "next" activator, is used to scroll forward to the new message or through the subsequent text in the currently displayed message. Another activator, such as the "prev" activator, is used to scroll backwards to previously reviewed messages or through previously reviewed text in the currently displayed message.

Another suitable activator, such as a "*3(aka "*D" for delete) deletes the current electronic message from the communication devices incoming message buffer. Entering an activator (such as "*12") deletes all electronic messages from the communication device's incoming message buffer.

Receiving or making a new call or pressing the "exit" button takes the communication device out of the message mode and returns it to the call mode. The message mode can be re-entered by receiving another electronic message or by pressing an administered message-retrieval button.

In one operational configuration, the feature server 228 permits a user to access or activate, deactivate, or modify a set of features (via electronic messages) including not only switch-controlled features but also those features controlled by feature activators (e.g., buttons) on a desk set. As discussed below, the ability to emulate activator presses on the user's desk set is effected by forwarding electronic messages including predetermined commands in the text or body portion or sign-in name handle portion of the message (the user portion of the destination address or characters before the "@" symbol) associated with various telephony features while the characters after the "@" symbol (or the domain name portion) are the address of the switch/server or a component thereof, such as the feature server. For example, a SIP formatted message method for forwarding calls could be "invite fwd: xxx to yyyy@system" wherein "invite" is a message method defined by SIP, "xxxx" is the extension for which calls are to be forwarded, "yyyy" is the extension to which calls are to be forwarded, and "system" is the address of the switch/server. In another example, call forwarding can be effected by a text message in the message body "set call forward to extension xxxx" with the SIP headers specifying the communication device or group of communication devices the feature activation is for or otherwise indicate the person sending the message. In the latter case, the switch/service can use the administered information associated with the person to determine what internal communication device(s) the feature activate/deactivate command is intended for. As will be appreciated, a new message method, such as "invoke", can be defined for such feature invocations. The feature activation functionality is in addition to conventional remote feature access using feature access codes. In response to the message, the feature activator determines which feature is to be invoked and effects activation, deactivation, or modification of the specified feature.

Although any class of features can be accessed rising the feature access agent, including (a) features that are invoked prior to placing a call, (b) features that are invoked during a call, (c) features that are non-call associated that do not require display interactions, (d) features that are non-call associated that require display interactions, (e) features that are operated against calls not associated with the activating station, and (f) features that are operated against an alerting call, classes (a), (b), and (c) are particularly useful for a user. Examples of such features include without limitation analog bridged appearance select, abbreviated dialing, active appearance select, automatic appearance select, automatic call back, automatic intercom, autodial, bridled appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-switch enable (to enable the mapping agent), extend call off-switch disable (to disable the mapping agent) group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

In another operational configuration, the feature server 228 is configured to inform a specified communication device or devices of system or communication device feature status. This is particularly useful where an instant message service either does not have presence capabilities or its presence capabilities do not support the desired application. When detecting a status change, the server 228 generates and sends a message, such as a SIP message method, to one or more specified communication devices. What features to monitor and communication devices to inform are administered. For example, when a communication device that activates call forwarding the server 228 would generate a SIP message method and send it to an instant message service indicating the calls for that communication device are being forwarded and possibly the location of the call is being forwarded to. Another example would be instant message clients administered as internal communication devices could inform the user of lamp status (such as the message waiting light) updates through this mechanism. In this example, the extension associated with the monitored communication device is associated with a mailbox on a messaging server. Whenever the messaging server (not shown) detects that the mailbox goes from having no unaccessed messages to having some or from some to none, the server informs the switch/server that the state of the message waiting lamp associated with the extension should be changed. An instant message is sent to the predetermined destination indicating the change in message waiting state.

Feature activation initiated by an instant messaging service or status conveyed to an instant messaging service can be encoded in a number of different ways. For example and as noted above, the encoding could be through a predefined markup language body, such as using extended markup language. The instant messaging protocol (for example SIP using a message method) acts as a conduit for the feature activation or feature status formatted information. The feature activation could be done entirely through an existing instant messaging application or through a new or adjunct application, which would properly format/interpret the body of the messaging conveying the feature information, By using instant messaging as a conduit for feature activation, it is possible to enable existing instant messaging applications/ services (such as provided by the service providers noted above) with some of the features offered by a telephony switch/server, such as a PBX.

The database 204 may be, e.g. an optical or magnetic disk-based storage device, or other conventional storage device associated with or otherwise accessible to the switch/server 102. The database 204 may be used to store, e.g., feature assignments to particular text commands, subscriber profiles, activator-to-text relationships, message destination addresses, directory number assignments to corresponding call appearances or direct facility termination keys, access restrictions, and other known administrative information regarding the configuration of the system 100, as well as other types of information.

The service circuits 210 may include tone generators, announcement circuits, etc. These circuits and the interfaces 206 are controlled by processor 200 in implementing call processing functions in the switch/server 102.

The switch/server 102 may include additional elements that are omitted from FIG. 2 for simplicity and clarity of illustration. For example, the switch may include a port card for each type of user communication device associated therewith. In addition, it will be appreciated by those skilled in the art that the switch/server 102 may be configured to support multiple user communication devices of different types, e.g., wired desk set communication devices, wireless desk set communication devices, personal computers, video telephones or other advanced communication devices, etc.

Also associated with the switch/server 102 may be an administrator communication device (not shown) which is used to program the operation of the switch/server 102 during a system administration, e.g., an initial set-up and configuration of the system of a subsequent system-level or user-level configuration.

Other devices not shown in the figures may be associated with the switch/server 102, such as an adjunct feature server. Such an adjunct may be physically incorporated within the switch and may be partially or completely implemented using other switch/server elements such as processor 200 and memory 202. As will be appreciated, the electronic message interfacing agent and feature server can alternatively be located external to the switch/server, such as in an adjunct processor.

Operation of the Electronic Message Interfacing Agent

Figure 3:
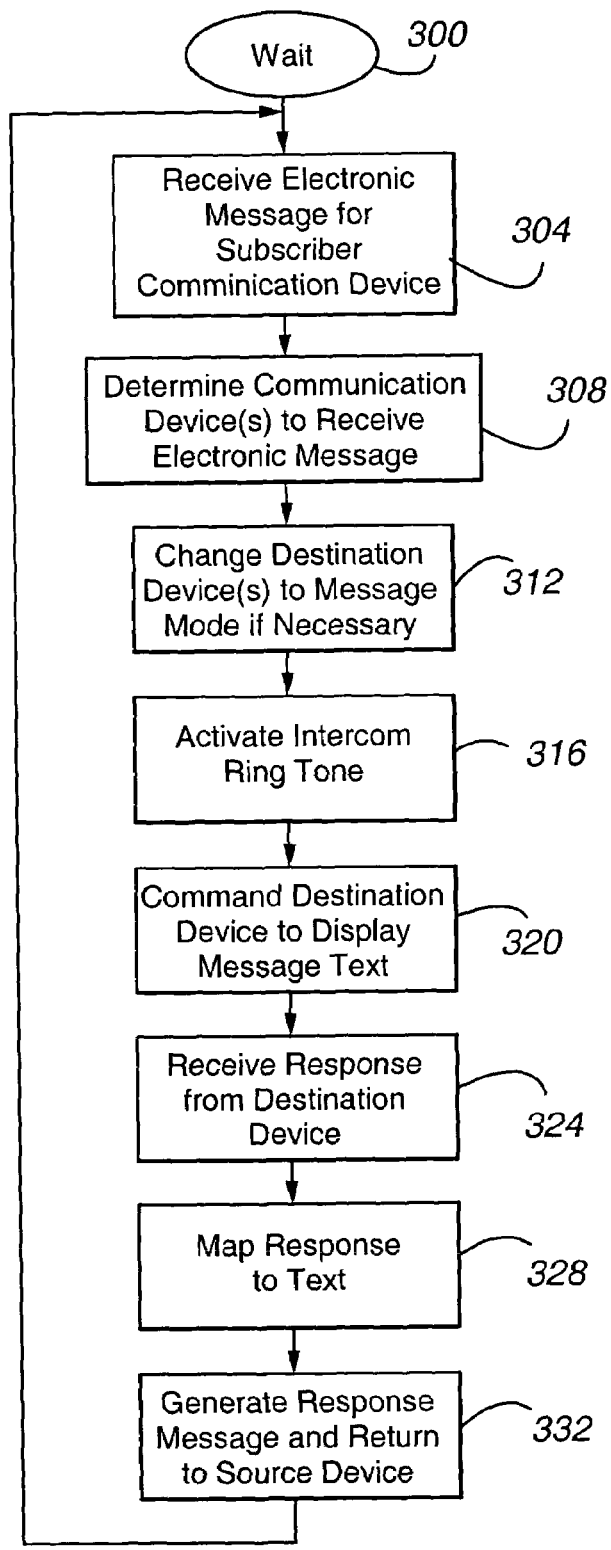
FIG. 3 is a flow diagram showing the operation of the electronic message interfacing agent according to an embodiment of the present invention.

Referring to FIG. 3, an operational configuration of the electronic message interfacing agent 224 will be described. This configuration shows the operation of the agent when an electronic message is received for an internal communication device.

In step 300, the agent 224 is in a waiting state until, in step 304, an electronic message is received for an internal or subscriber communication device or terminal. In step 304, the message may be addressed to the agent and indicate in its text the target communication device(s) or be directly addressed to the communication device(s). The agent 224 receives such packet-switched electronic messages from communication devices 116, checks the integrity of the message, and performs any necessary authentication.

The incoming message is parsed by the agent to determine in steps 308 and 312 the internal communication device(s) to receive the electronic message. As will be appreciated, the message can specify multiple destination addresses or multiple destination addresses can be administered for a message to a given address. For example, the paging capabilities already existent in the switch/server, such as using predefined (hunt) groups and group types, calling groups, and/or bridging groups, can be used to transmit an electronic message automatically and substantially simultaneously to multiple communication devices. In one configuration, an incoming message is forwarded to the most idle member of a hunt group. In that event, the agent may take the first response received as the sole response to the sender or may forward each response received to the sender. The forwarding of the message to multiple device(s) is particularly useful when the intended recipient has several associated communication devices, such as a desk phone, a PC, a laptop, a cellular phone, and a Personal Digital Assistant. The message be broadcast to all of these devices to increase the likelihood that the intended recipient will receive and respond to the message quickly.

In step 316, the agent 224 changes the modification the receiving communication device(s) from call mode to message mode, if necessary. In this manner, the communication device is configured to display and reply to the text of the incoming message.

In step 320, the agent activates each of the receiving communication device's intercom ring tones (if the device is not engaged in a telephone call) to notify the user of the receipt of the message.

In step 304, the agent commands each of the receiving communication devices to display the text of the electronic message. An example of the updated display is presented in FIG. 7. The display can be updated during a telephone conversation such that the call appearances and other call related information on the display are replaced by the text of the electronic message. Typically, the display the incoming message will not cause previously received messages to be deleted from the device's corresponding buffer.

In step 328, the agent receives a response from one of the receiving communication devices. The response may be to delete or store the message or a text response to the sender.

The message text is commonly transmitted by a separate signal channel of the device and not by DTMF signals.

In step 332, the agent maps the response to determine the nature of the response and, if a text response, the specific response text. The mapping step maybe performed using any suitable technique, such as using the table of FIG. 8.

In step 332, the agent, based on the mapping step, generates the response message and transmits the message to the device from when the original message was received.

Figure 4:
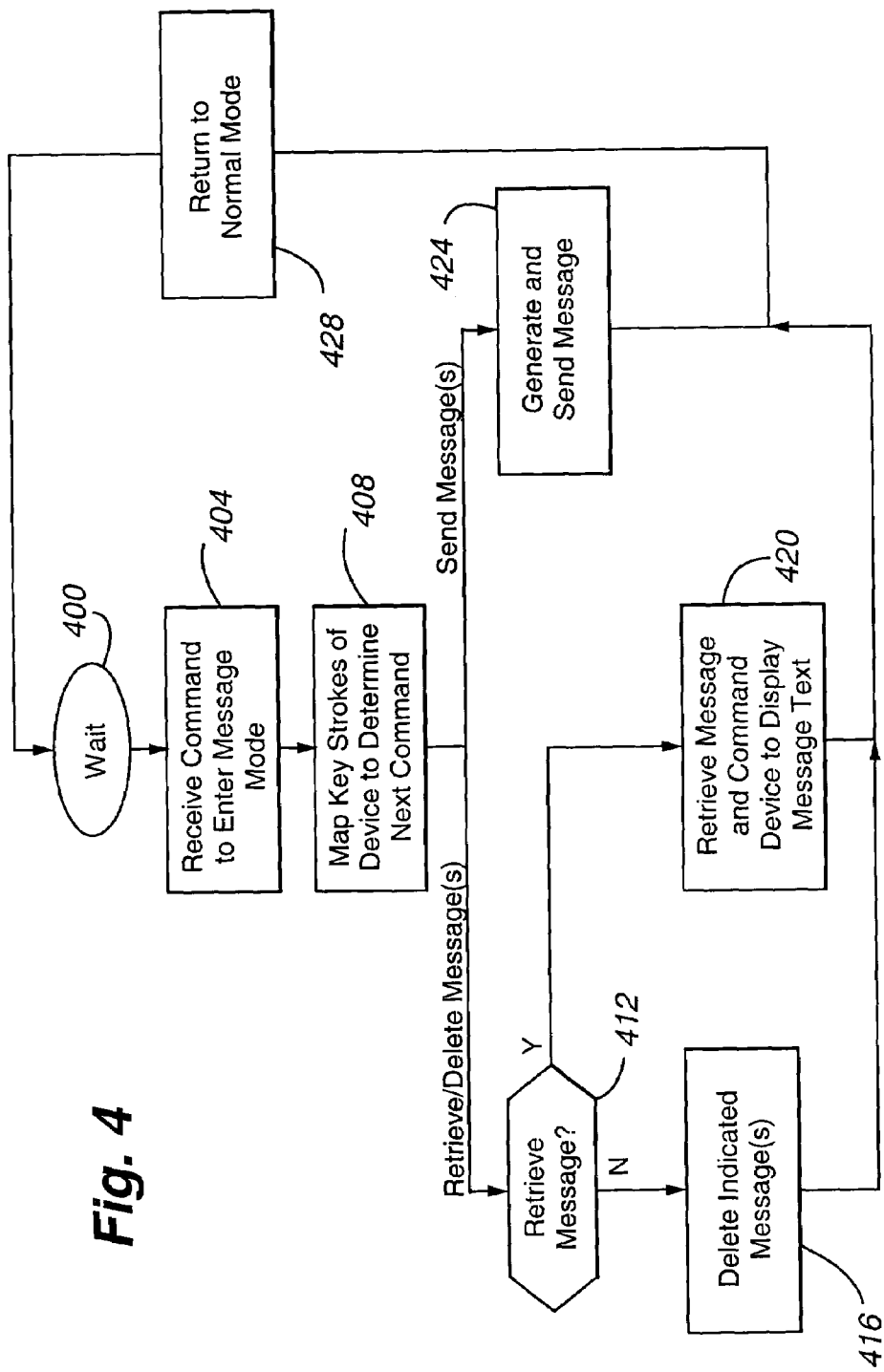
FIG. 4 is a flow diagram showing the operation of the electronic message interfacing agent according to another embodiment of the present invention.

Referring to FIG. 4, another operational configuration of the electronic message interfacing agent 224 will be described. This configuration shows the operation of the agent when an original electronic message is received from an internal communication device.

The agent 224 is in the waiting state (step 400) and the communication device is in the call mode until a command is received in step 404 to enter the message mode. In step 408, the agent 224 maps the key strokes received from the communication device to determine the next command. There are two possible commands, namely to retrieve/delete messages and send a message.

When the command is to retrieve/delete one or more specified messages, the agent in decision diamond 412 determines whether the user has requested the retrieval of the specified message(s). If not, the agent in step 416 deletes the specified message(s). If so, the agent in step 420 retrieves the specified message(s) and commands the communication device to display the text of the retrieved message(s). After completing steps 416 or 420, as the case may be, the agent returns to the normal or call mode and returns to step 428.

When the command is to send a message, the agent in step 424 generates and sends the message. The agent then performs step 428.

Operation of the Feature Server

Figure 5:
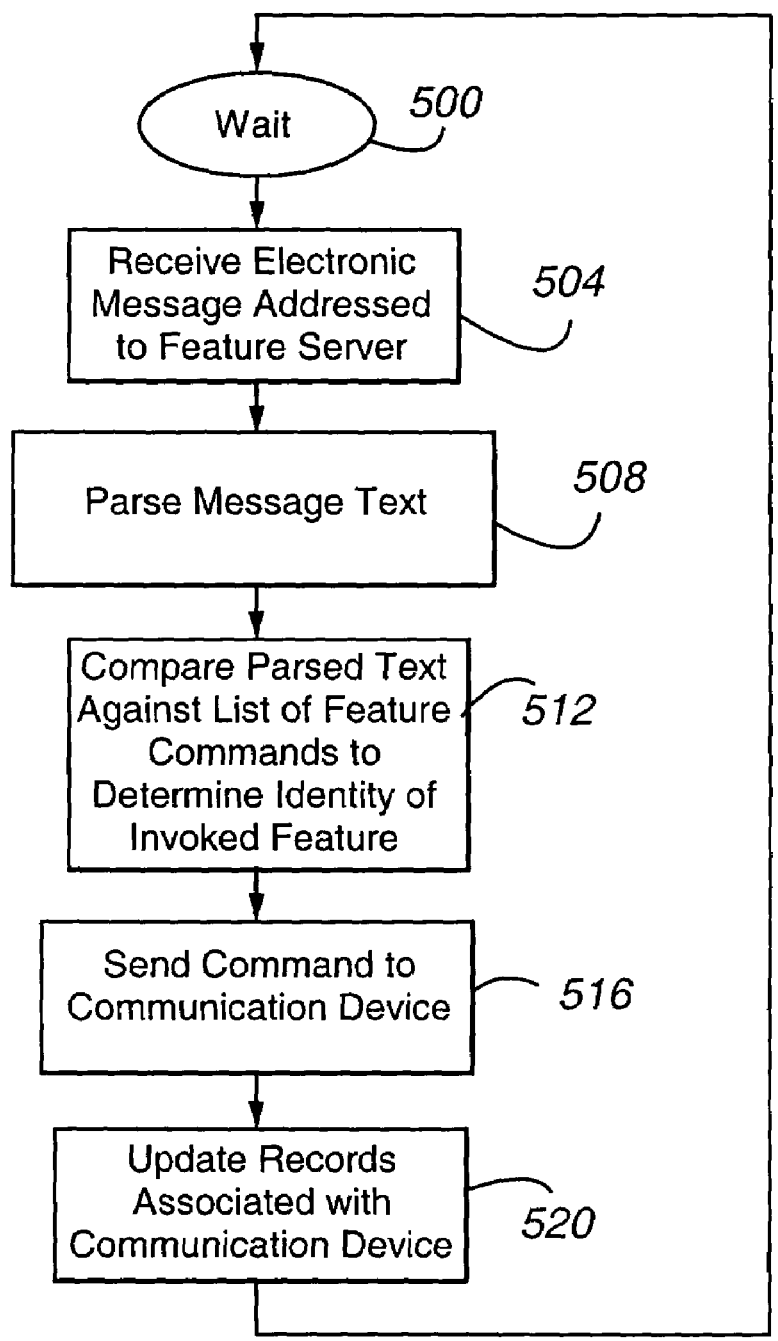
FIG. 5 is a flow diagram showing the operation of the feature server according to an embodiment of the present invention.

Referring to FIG. 5, an operational configuration of the feature server 228 will be described. This configuration shows the operation of the feature server 228 when an electronic message is received to invoke a feature associated with an internal communication device. The server permits a sender to activate features remotely, as if natively activated on an internal communication device.

In step 500, the feature server 228 is in the waiting state.

In step 504, an electronic message is received addressed to the feature server. The feature server 228, based on the source address determines that the sender has authorization to request invocation of a feature. This is typically performed by retrieving from data storage the profile of the user associated with the destination address. If no profile is available, the sender is assumed to lack authority to invoke the feature and the feature server returns to the waiting state.

In step 504, when the sender has authorization to invoke a feature, the feature server in step 508 parses the message text and(in step 512 compares the parsed text against a list or table of feature commands to determine the identity of the feature to be invoked and how it is to be invoked if appropriate. The list typically provides, for each feature, a corresponding character or sequence of characters the feature. For example, "fwd" could invoke call forwarding from an extension to an extension specified in the message. The feature server is configured to recognize the message as a command to perform an operation rather than a message to be forwarded to a destination.

In step 516 after the identity, of the command is determined the feature server sends a command to the communication device, if necessary, to invoke the desired feature. In step 520, the feature server 228 updates the records associated with the sender/communication device to reflect invocation of the feature. The feature server, if appropriate, receives confirmation from the communication device that the feature has been invoked.

The feature server then returns to step 500.

Figure 6:
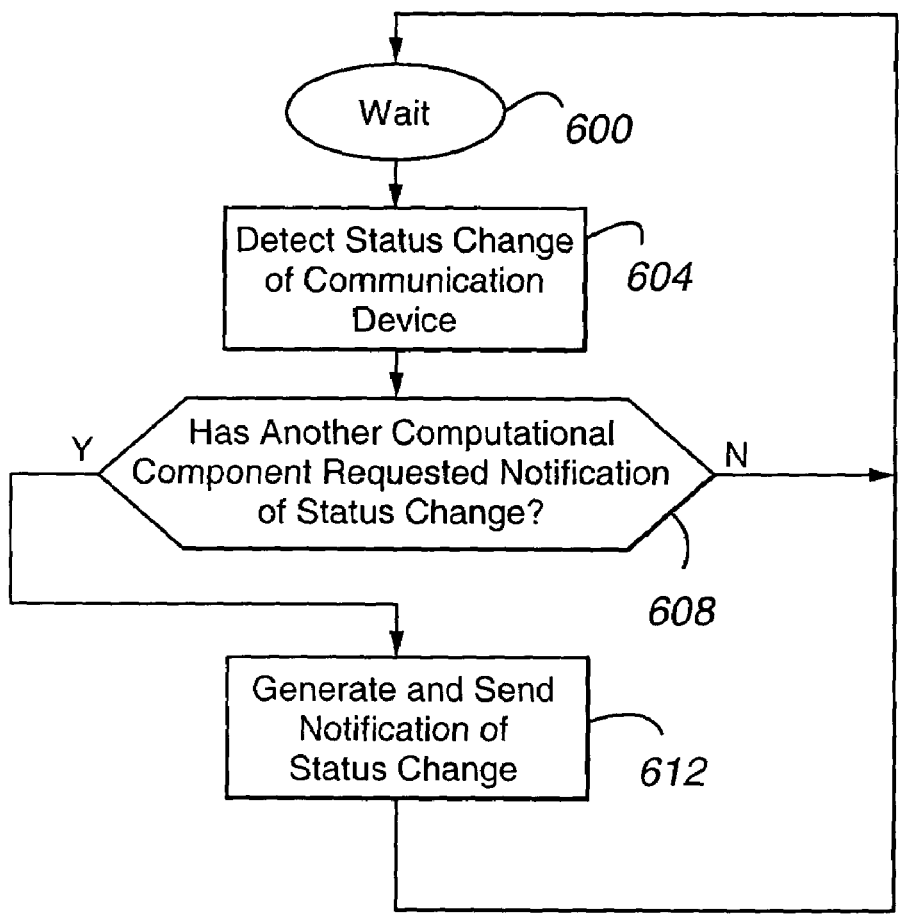
FIG. 6 is a flow diagram showing the operation or the feature server according to another embodiment of the present invention.

Referring to FIG. 6, another operational configuration of the feature server 228 will be described. This configuration shows the operation of the feature server 228 when status change of a communication is detected and an electronic message is sent to one or more specified destinations providing notification of the status change.

In step 600, the feature server 228 detects a status change of a communication device. The server in decision diamond 608 then determines whether or not another computational component has requested notification of the status change. If so, the feature server in step 612 generates and sends notification of the status change to the specified computational components. If not or after the performance of step 612, the feature server returns to the waiting mode in step 600.

A number of variations and modifications of the invention can be used. It would be possible to provide for some features of the invention without providing others.

For example in one alternative embodiment, the feature server is dislocated from the switch/server and a standard protocol, such as SIP, is used between the switch/server and the feature server. The feature server originates sessions to custom URNS (e.g., sip:goto-cover@system and sip:fwd-4805 to 5510@system) and the switch/server interprets those sessions as feature activation requests. Such requests can even perform mid-call operations. This embodiment permits nearly full access to switch/server features from the outboard feature server using a standard protocol.

In another alternative embodiment, the interfacing agent is located at least in part in the communication device.

In yet another alternative embodiment, the interfacing agent and feature server are combined into the same module or split up into one or more submodules. The modules can be collocated or distributed depending on the application.

In yet another alternative embodiment, the interfacing agent and/or feature server are implemented in whole or part as a logic circuit, such as an Application Specific Circuit or ASIC.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for accessing switch functionality from an external endpoint, comprising:

providing at least one of a switch and server, at least one internal endpoint, and at least one external endpoint, each of the at least one internal and external endpoints being in communication with the at least one of a switch and server and being associated with a common user, wherein the at least one internal endpoint comprises a plurality of feature activators for activating a plurality of features;

receiving from the at least one external endpoint an incoming contact comprising a packet-switched text communication comprising an identity of at least one of a feature activator and a feature;

determining, by the switch, that the text communication comprises a feature command and is not intended to be forwarded to a subscriber;

determining, by the switch, based on the source address of the text communication, that the sender has authorization to request invocation of a feature activator and/or feature;

parsing, by the switch, the text communication and comparing, by the switch, the parsed text against a set of feature commands to identity the at least one of the selected feature activator and feature;

determining when the identified at least one of a feature activator and feature has a corresponding entry in a stored list of identifiers, the entries in the stored list of identifiers being associated with at least one of (i) a plurality of feature activator identifiers associated with the plurality of feature activators and (ii) a plurality of feature identifiers associated with the plurality of features; and when the identified at least one of a feature activator and feature has a corresponding entry in the stored list, activating at least one of the associated feature activator and feature.

2. The method of claim 1, wherein the contact is received at the external port of the at least one of a switch and server from an originator terminal utilizable external to a premises serviced by the at least one of a switch and server and not having an extension associated with any internal endpoint serviced by the at least one of a switch and server.

3. The method of claim 1, wherein the determining step comprises mapping the identified at least one of a feature activator and feature associated with the incoming contact to the corresponding entry in the stored list.

4. The method of claim 1, wherein the corresponding entry is at least one of the plurality of feature activator identifiers.

5. The method of claim 1, wherein the corresponding entry is at least one of the plurality of feature identifiers.

6. The method of claim 1, wherein the incoming contact is originated by an originator terminal comprising a computer coupled to a packet-switched network external to a premises serviced by the at least one of a switch and server.

7. The method of claim 1, wherein in the activating step the at least one of a switch and server processes the associated at least one of the plurality of feature activator identifiers and plurality of feature identifiers as if the user had pressed the associated feature activator in the internal endpoint while the internal endpoint was in service and off hook.

8. The method of claim 1, wherein the plurality of features are selected from one or more of the following sets of features: (a) features that are invoked prior to placing a contact, (b) features that are invoked during a contact, (c) features that are non-contact associated that do not require display interactions, (d) features that are non-contact associated that require display interactions, (e) features that are operated against contacts not associated with the activating station, and (f) features that are operated against an alerting contact.

9. The method of claim 1, wherein the plurality of features comprise a plurality of the following features: analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-at least one of a switch and server enable (to enable the mapping agent), extend call off-at least one of a switch and server disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

10. The method of claim 1, wherein the identified at least one of a feature activator and feature is associated with an internal extension associated with the at least one of a switch and server.

11. The method of claim 1, wherein, in the stored list, the plurality of feature activator identifiers are based upon activator position on the internal endpoint.

12. The method of claim 1, wherein the at least one internal endpoint comprises a plurality of internal endpoints, each of the plurality of internal endpoints having a plurality of corresponding feature activators and wherein a common identified at least one of a feature activator and feature defines a first feature for a first internal endpoint and a second feature for a second internal endpoint and the first and second features are different.

13. The method of claim 1, further comprising:

providing an electronic message to the user after the activating step, the electronic message indicating the success or failure of feature activation.

14. The method of claim 1, wherein the packet-switched communication comprises a source address, a destination address, and a body, wherein the destination address is associated with the at least one of switch and server.

15. The method of claim 1, wherein the packet-switched communication comprises a source address, a destination address, and a body, wherein the identity of the at least one of feature activator and feature is located in the body.

16. The method of claim 1, wherein the packet-switched communication comprises a header and a body, wherein the identity of the at least one of feature activator and feature is located in the header.

17. The method of claim 1, wherein the text communication has text and domain name portions, the text portion comprising the identity of the at least one of the selected feature activator and feature and the domain name portion comprising the electronic address of the switch or a component thereof.

18. The method of claim 1, wherein the text communication has a sign-in name handle and domain name portions, the sign-in name handle portion comprising the identity of the at least one of the selected feature activator and feature and the domain name portion comprising the electronic address of the switch or a component thereof.

19. The method of claim 1, further comprising:
detecting, by the switch, a change of status of the telephone;
determining, by the switch, whether or not an external endpoint has requested notification of the status change; and
when an external endpoint has requested notification of the status change, generating and sending to the external endpoint a text notification of the status change.

20. The method of claim 1, further comprising:
generating, by the switch, and sending a text message to the external endpoint, the message comprising a current feature setting of the telephone.

21. A system including a switch being in communication with at least one internal telephone having a plurality of feature activators and associated features and at least one external endpoint, wherein the switch is operable to control feature invocation by the internal telephone, the system comprising:
a feature server operable to:
(i) receive, from the at least one external endpoint, an incoming contact comprising a packet-switched text communication comprising an identity of at least one of a selected feature activator and feature;
(ii) determine that the text communication comprises a feature command and is not intended to be forwarded to a subscriber;
(iii) determine, based on the source address of the text communication, that the sender has authorization to request invocation of a feature activator and/or feature;
(iv) parse the text communication and comparing the parsed text against a set of feature commands to identity the at least one of the selected feature activator and feature;
(v) determine when the identified at least one of a selected feature activator and feature has a corresponding entry in a stored list of identifiers, the entries in the stored list of identifiers being associated with at least one of (A) a plurality of feature activator identifiers associated with the plurality of feature activators and (B) a plurality of feature identifiers associated with the plurality of features; and
(vi) when the identified at least one of a selected feature activator and feature has a corresponding entry in the stored list, activate at least one of the associated identified feature activator and feature.

22. The system of claim 21, wherein the contact is received at the external port of the switch from an originator terminal utilizable external to a premises serviced by the switch and not having an extension associated with any internal endpoint serviced by the switch; and
wherein the feature server maps the identified at least one of a selected feature activator and feature associated with the incoming contact to the corresponding entry in the stored list.

23. The system of claim 22, wherein the corresponding entry is associated with at least one of the plurality of feature activator identifiers.

24. The system of claim 22, wherein the corresponding entry is associated with at least one of the plurality of feature identifiers.

25. The system of claim 21, wherein the server processes the associated at least one of the plurality of feature activator identifiers and plurality of feature identifiers as if the user had pressed the associated feature activator in the internal endpoint while the internal endpoint was in service and off hook.

26. The system of claim 21, wherein the plurality of features are selected from one or more of the following sets of features: (a) features that are invoked prior to placing a contact, (b) features that are invoked during a contact, (c) features that are non-contact associated that do not require display interactions, (d) features that are non-contact associated that require display interactions, (e) features that are operated against contacts not associated with the activating station, and (f) features that are operated against an alerting contact.

27. The system of claim 26, wherein the plurality of features comprise a plurality of the following features: analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-at least one of a switch and server enable (to enable the mapping agent), extend call off-at least one of a switch and server disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

28. The system of claim 21, wherein the server provides an electronic message to the user after the activating step, the electronic message indicating the success or failure of feature activation.

29. The system of claim 21, wherein the text communication has text and domain name portions, the text portion comprising the identity of the at least one of the selected feature activator and feature and the domain name portion comprising an electronic address different from an electronic address of the internal telephone.

30. The system of claim 21, wherein the text communication has a sign-in name handle and domain name portions, the sign-in name handle portion comprising the identity of the at least one of the selected feature activator and feature and the domain name portion comprising an electronic address different from an electronic address of the internal telephone.

31. The system of claim 21, wherein the switch detects a change of status of the telephone; determines whether or not an external endpoint has requested notification of the status change; and when an external endpoint has requested notification of the status change, generates and sends to the external endpoint a text notification of the status change.

32. The system of claim 21 wherein the switch generates and sends a text message to the external endpoint of a current feature setting of the telephone.

33. A method, comprising:
   detecting, by a switch, a change of status of a telephone controlled by the switch;
   determining, by the switch, whether or not an external endpoint has requested notification of the status change;
   when an external endpoint has requested notification of the status change, generating and sending to the external endpoint a text notification of the status change;
   receiving from the external endpoint an incoming contact comprising a packet-switched text communication comprising an identity of at least one of a selected feature activator and feature;
   determining, by the switch, that the text communication comprises a feature command and is not intended to be forwarded to a subscriber;
   determining, by the switch, based on the source address of the text communication, that the sender has authorization to request invocation of a feature activator and/or feature;
   parsing, by the switch, the text communication and comparing, by the switch, the parsed text against a set of feature commands to identity the at least one of the selected feature activator and feature;
   determining when the identified at least one of a selected feature activator and feature has a corresponding entry in a stored list of identifiers, the entries in the stored list of identifiers being associated with at least one of (i) a plurality of feature activator identifiers associated with the plurality of feature activators and (ii) a plurality of feature identifiers associated with the plurality of features; and
   when the identified at least one of a feature activator and feature has a corresponding entry in the stored list, activating at least one of the associated identified feature activator and feature.

34. The method of claim 33, further comprising:
   generating and sending, by the switch, a text message to the external endpoint, the message comprising a current feature setting of the telephone.

35. The method of claim 33, wherein the contact is received at the external port of the switch from an originator terminal utilizable external to a premises serviced by the switch and not having an extension associated with any internal endpoint serviced by the switch; and
   wherein the determining step comprises mapping the identified at least one of a selected feature activator and feature in the incoming contact to the corresponding entry in the stored list.

36. The method of claim 33, wherein the corresponding entry is associated with at least one of the plurality of feature activator identifiers.

37. The method of claim 33, wherein the corresponding entry is associated with at least one of the plurality of feature identifiers.

38. The method of claim 33, wherein in the activating step the switch processes the associated at least one of the plurality of feature activator identifiers and plurality of feature identifiers as if the user had pressed the associated feature activator in the internal endpoint while the internal endpoint was in service and off hook.

39. The method of claim 33, wherein the text communication has text and domain name portions, the text portion comprising the identity of the at least one of the selected feature activator and feature and the domain name portion comprising the electronic address of the switch or a component thereof.

40. The method of claim 33, wherein the text communication has sign-in name handle and domain name portions, the sign-in name handle portion comprising the identity of the at least one of the selected feature activator and feature and the domain name portion comprising the electronic address of the switch or a component thereof.

41. The method of claim 33, wherein the plurality of features are selected from one or more of the following sets of features: (a) features that are invoked prior to placing a contact, (b) features that are invoked during a contact, (c) features that are non-contact associated that do not require display interactions, (d) features that are non-contact associated that require display interactions, (e) features that are operated against contacts not associated with the activating station, and (f) features that are operated against an alerting contact.

42. The method of claim 33, wherein the plurality of features comprise a plurality of the following features: analog bridged appearance select, abbreviated dialing, active appearance select, automatic appearance select, automatic call back, automatic intercom, autodial, bridged appearance selection, call appearance selection, call forwarding all, call forwarding busy/no answer, call forwarding deactivation, call park, call unpark, call pick-up, conference no answer, conference, calling party number block, calling party number unblock, dial intercom, directed call pick-up, drop last added party, drop call, exclusion (which prevents a user from being active on the same call on a physical port and a trunk port), extend call off-at least one of a switch and server enable (to enable the mapping agent), extend call off-at least one of a switch and server disable (to disable the mapping agent), group page, handover, held appearance select, hunt night service, last number dialed, malicious call trace activation, malicious call trace deactivation, manual message waiting, priority call, send all calls, manual signaling, transfer on hang up, transfer to voice mail, and trunk night service.

43. The method of claim 33, further comprising:
   providing an electronic message to the user after the activating step, the electronic message indicating the success or failure of feature activation.

44. A computer readable medium comprising executable instructions operable to perform the steps of claim 1.

45. A computer readable medium comprising executable instructions operable to perform the steps of claim 33.

* * * * *